(12) United States Patent
Hoang

(10) Patent No.: US 9,200,572 B2
(45) Date of Patent: Dec. 1, 2015

(54) COMPRESSOR SURGE PREVENTION DIGITAL SYSTEM

(75) Inventor: Tuyen Trong Hoang, Montreal (CA)

(73) Assignee: PRATT & WHITNEY CANADA CORP., Longueuil, CA (US)

( * ) Notice: Subject to any disclaimer, the term of this patent is extended or adjusted under 35 U.S.C. 154(b) by 564 days.

(21) Appl. No.: 13/613,899

(22) Filed: Sep. 13, 2012

(65) Prior Publication Data
US 2014/0069105 A1 Mar. 13, 2014

(51) Int. Cl.
*F02C 9/52* (2006.01)
*F04D 27/00* (2006.01)
*F04D 27/02* (2006.01)

(52) U.S. Cl.
CPC .............. *F02C 9/52* (2013.01); *F04D 27/001* (2013.01); *F04D 27/02* (2013.01); *F04D 27/0207* (2013.01); *F04D 27/0215* (2013.01); *F04D 27/0223* (2013.01); *F05B 2270/108* (2013.01); *F05B 2270/1081* (2013.01); *F05B 2270/10812* (2013.01); *F05B 2270/10815* (2013.01); *F05B 2270/10817* (2013.01); *F05D 2270/101* (2013.01); *F05D 2270/301* (2013.01); *F05D 2270/44* (2013.01)

(58) Field of Classification Search
CPC .................. F05B 2270/108; F05B 2270/1081; F05B 2270/10812; F05B 2270/10815; F05B 2270/10817; F02C 9/52
See application file for complete search history.

(56) References Cited

U.S. PATENT DOCUMENTS

| | | | |
|---|---|---|---|
| 3,971,208 A | 7/1976 | Schwent | |
| 4,655,034 A | 4/1987 | Kenison et al. | |
| 4,756,152 A | 7/1988 | Krukoski et al. | |
| 5,448,881 A * | 9/1995 | Patterson et al. | 60/794 |
| 5,892,145 A | 4/1999 | Moon et al. | |
| 6,364,602 B1 | 4/2002 | Andrew et al. | |
| 6,506,010 B1 * | 1/2003 | Yeung et al. | 415/1 |
| 6,513,333 B2 | 2/2003 | Sugitani | |
| 2001/0014837 A1* | 8/2001 | Escuret et al. | 700/170 |
| 2003/0007860 A1* | 1/2003 | Nakajima et al. | 415/1 |

* cited by examiner

*Primary Examiner* — Gerald L Sung
*Assistant Examiner* — Scott Walthour
(74) *Attorney, Agent, or Firm* — Norton Rose Fulbright Canada LLP

(57) ABSTRACT

Methods and devices for anticipating a surge in a gas turbine engine. Controlled pressure signal(s) may be compared with reference pressure signal(s), each of the controlled pressure signal(s) and reference pressure signal(s) having an associated time value. If the controlled pressure signal(s) are less than the reference pressure signal(s), a controlled pressure curve may be fitted through a predetermined number of points based on the controlled pressure value(s) and associated time value(s). A reference pressure curve may be fitted through the predetermined number of points based on the reference pressure value(s) and associated time value(s). A time to compressor surge may be estimated based on an intersection of the controlled pressure curve and the reference pressure curve.

13 Claims, 4 Drawing Sheets

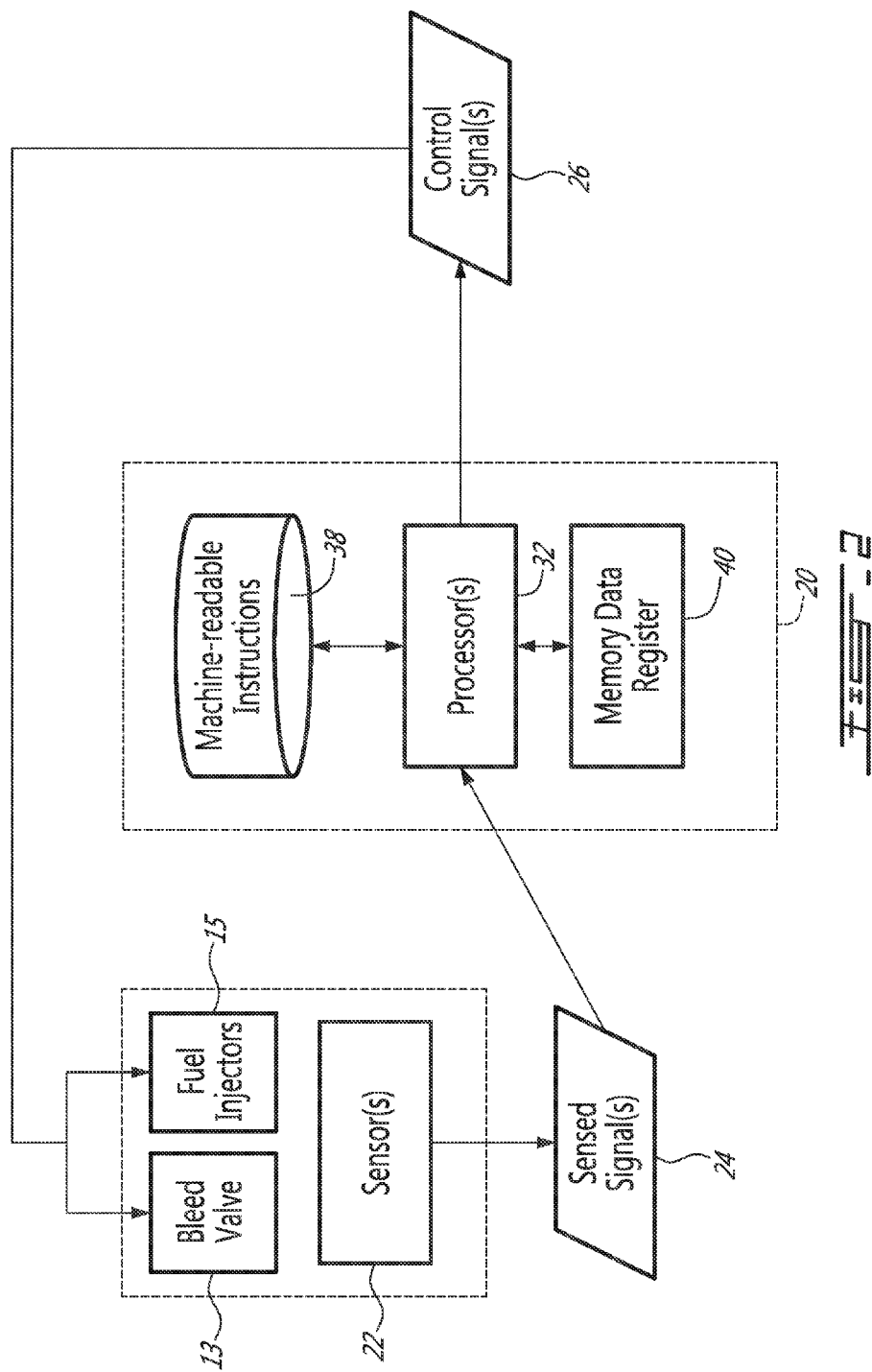

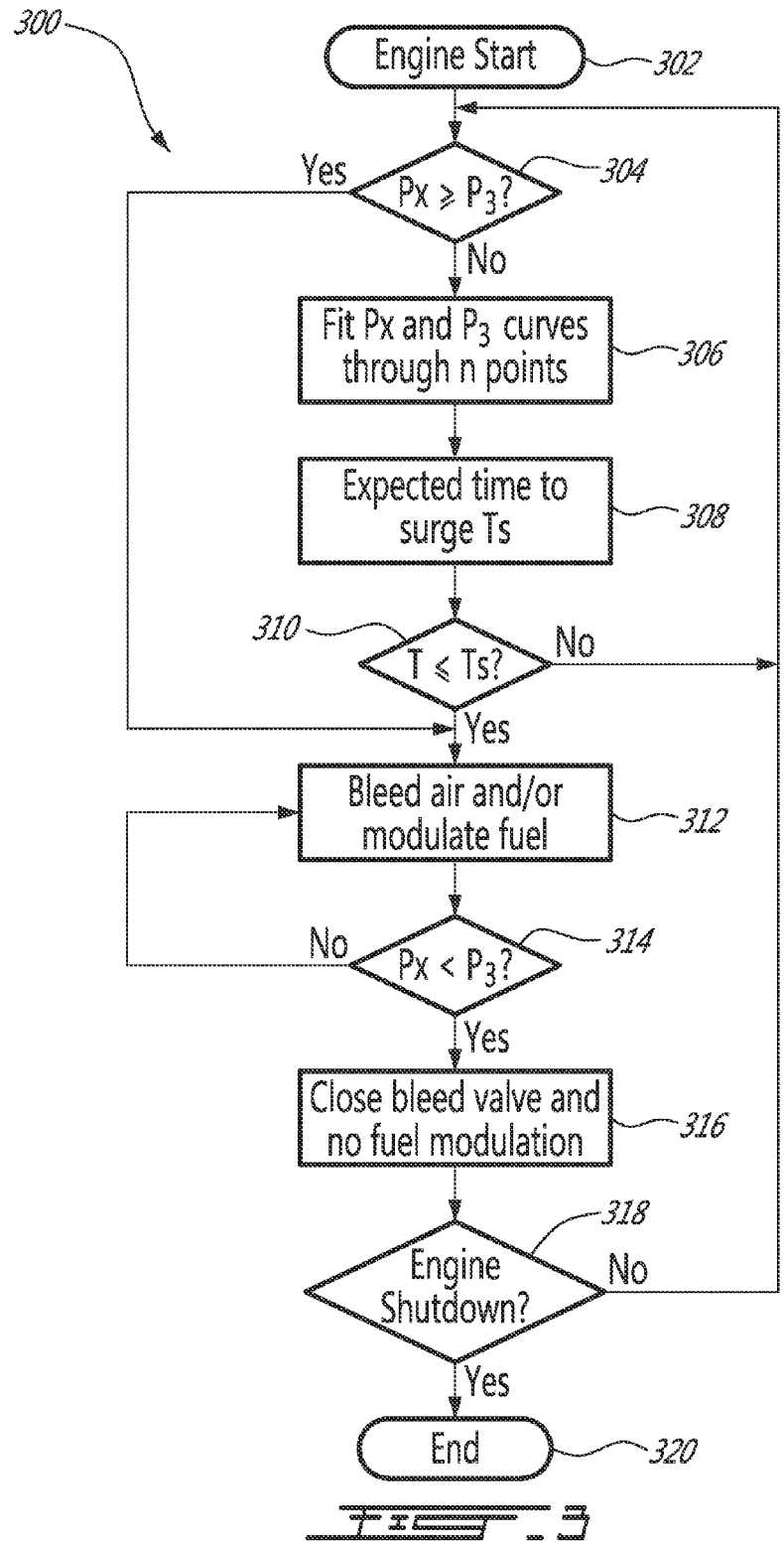

COMPRESSOR SURGE PREVENTION DIGITAL SYSTEM

TECHNICAL FIELD

The disclosure relates generally to gas turbine engines, and more particularly to compressor surge prevention digital systems.

BACKGROUND OF THE ART

A surge event in a gas turbine engine may occur when pressure at the delivery end of a gas turbine compressor becomes high as a result, for example, of reduced flow at the compressor outlet. In such circumstances, compressor pressure at the delivery end of the gas turbine engine may increase as air flow decreases. This may cause an air flow reversal. Such flow reversal may release the sudden pressure that has developed on account of reduced flow. The flow reversal may be accompanied by a loud noise and/or tremendous vibration. A surge event may affect the whole engine and, if it is of high enough magnitude, the gas turbine can be damaged or destroyed.

Anti-surge devices are sometimes installed on gas turbine engines to allow air flow to be reduced even on low speeds and to keep a certain air flow from the compressor during times of low air requirement (e.g. startup and shutdown). Some prior art systems have prevented compressor surges in turbine engines by using a pneumatic device which bleeds air when pressure at or before the compressor inlet surpasses a reference pressure, normally employing a single choice of bleed size. Improvement in compressor surge prevention in gas turbine engines is desirable.

SUMMARY

The disclosure describes electric machines, and in particular improved systems, devices, and processes for compressor surge prediction.

In some aspects, the disclosure provides a method for anticipating a surge in a gas turbine engine, the method may include: comparing at a signal processor one or more controlled pressure signals and one or more reference pressure signals, each of the one or more controlled pressure signals and the one or more reference pressure signals having an associated time value; and if the one or more controlled pressure signals are less than the one or more reference pressure signals, at the same or another signal processor: fitting a controlled pressure curve through a predetermined number of points, the points based on the one or more controlled pressure values and associated time values; fitting a reference pressure curve through the predetermined number of points, the points based on the one or more reference pressure values and associated time values; estimating a time to a compressor surge based on an intersection of the controlled pressure curve and the reference pressure curve; and generating one or more signals useful for controlling one or more bleed valves to reduce pressure proximate to a compressor of the gas turbine.

In some aspects, the disclosure provides a device useful for anticipating a surge in a gas turbine engine, the device may include: one or more processors configured to: receive one or more controlled pressure signals and one or more reference pressure signals, each of the one or more controlled pressure signals and the one or more reference pressure signals having an associated time value; and if the one or more controlled pressure signals are less than the one or more reference pressure signals: fit a controlled pressure curve through a predetermined number of points, the points based on the one or more controlled pressure values and associated time values; fit a reference pressure curve through the predetermined number of points, the points based on the one or more reference pressure values and associated time values; and estimate a time to a compressor surge based on an intersection of the controlled pressure curve and the reference pressure curve.

Further details of these and other aspects of the subject matter of this application will be apparent from the detailed description and drawings included below.

DESCRIPTION OF THE DRAWINGS

Reference is now made to the accompanying drawings, in which:

FIG. 2 shows a schematic diagram of a surge detection system in accordance with the disclosure;

FIG. 3 shows a flow chart illustrating an example of a method for detecting and/or preventing compressor surges in accordance with the disclosure.

DETAILED DESCRIPTION OF THE PREFERRED EMBODIMENTS

Various aspects of preferred embodiments are described through reference to the drawings.

Figure 1:
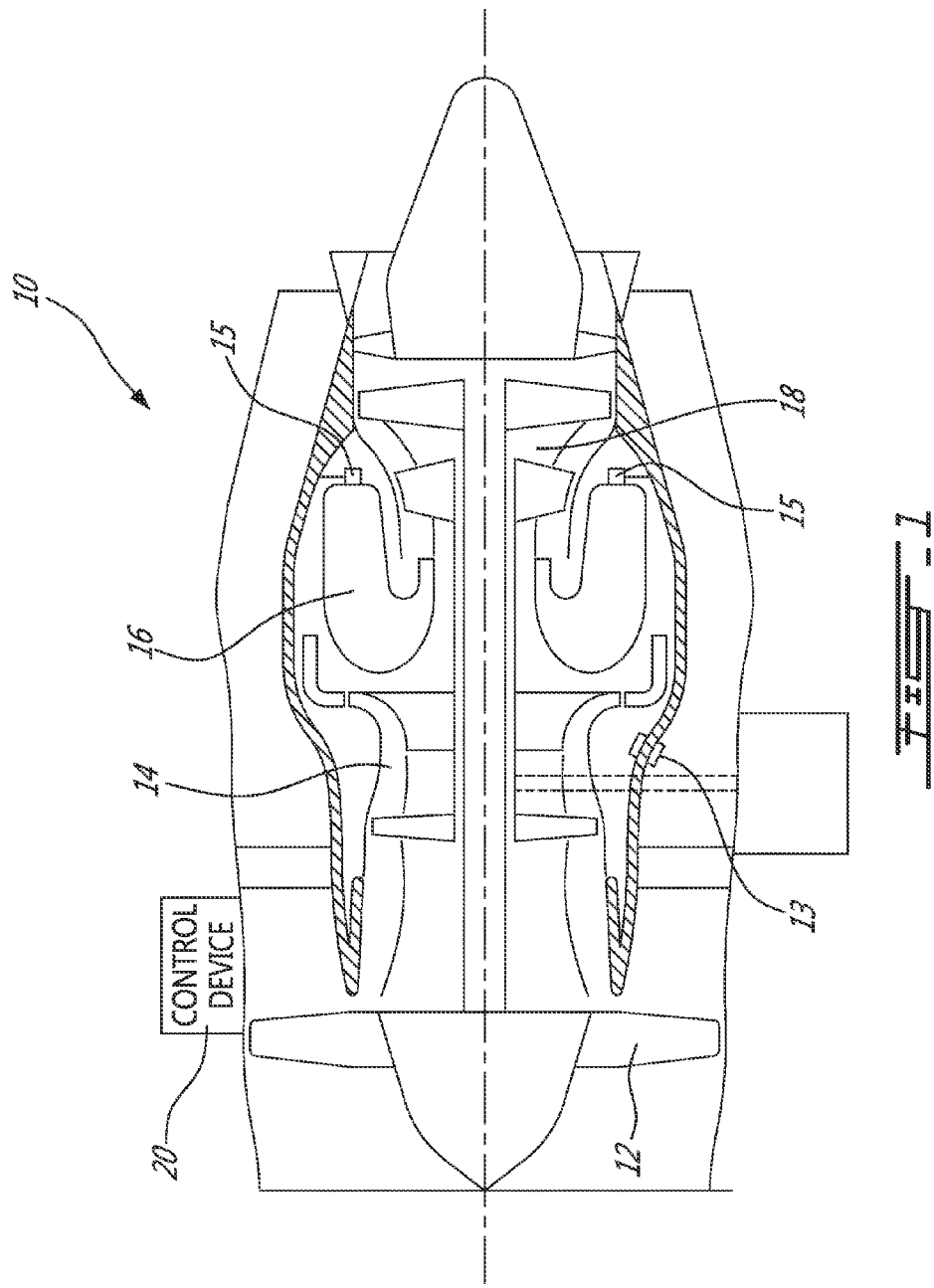
FIG. 1 shows an axial cross-section view of a turbo-fan gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel released through fuel injectors 15 and ignited for generating an annular stream of hot combustion gases, and a turbine section 18 for extracting energy from the combustion gases.

Engine 10 may also comprise one or more air bleed valves 13 which may allow air to be released (bled) from engine 10 in order to, for example, to diffuse back pressure caused by excess air in compressor 14. In various embodiments, the one or more air bleed valves 13 are located at or near, i.e., proximate to, the entrance to a first stage, and/or any subsequent stage, of the compressor 14 of engine 10. Bleeding air from compressor 14 of engine 10 may help prevent compressor surges by releasing some of the air pressure built up in or in front of compressor 14.

An example of a gas turbine engine 10 suitable for use in implementing the disclosure is a turbofan engine configured for use in an aircraft application. In aircraft and other applications, engine 10 may comprise one or more control device(s) 20 which may automatically regulate at least some aspect(s) of the operation of engine 10 based on one or more input variable(s). Control device(s) 20 may, for example, be configured to receive multiple input variables representative of current flight conditions including, for example, air pressure, total temperature of inlet air, throttle lever position, engine temperatures, engine pressures, and potentially many other parameters. Accordingly, control device(s) 20 may receive one or more signal(s) from one or more sensor(s) positioned throughout the engine 10 associated with various aspects of the operation of engine 10. Such signals may be received as input(s) by control device(s) 20 and analyzed by one or more automatic data processor(s) according to stored machine-readable instructions. Engine parameters such as fuel flow, variable inlet guide vane position, bleed valve 13 position, and others may be computed from this data and applied as appropriate by, for example, generating suitably-configured output signals and providing them to relevant device(s) associated with the engine 10. For example, output signals may be provided which control fuel flow from fuel injectors 15 or such signals may be provided to a fuel control unit (FCU) controlling fuel injectors 15 or fuel nozzles. Output signals may also control the position of one or more bleed valve(s) 13 which may be configured to allow air, and consequently air pressure, to be released from compressor section 14.

In various embodiments, control device(s) 20 may include or form part of a Full Authority Digital Engine Control (FADEC) which may, for example, comprise one or more digital computer(s) or other data processors, sometimes referred to as electronic engine controller(s) (EEC) and related accessories configured to control at least some aspects of performance of engine 10. Control device(s) 20 may for example be configured to make decisions regarding the control of engine 10 until a pilot wishes to or is required to intervene. Control device(s) 20 may be configured to provide optimum engine efficiency for a given flight condition. As data processors, control device(s) 20 may include one or more microcontroller or other suitably programmed or programmable logic circuits.

FIG. 2 schematically illustrates an exemplary embodiment of control device(s) 20 configured to receive sensed signal(s) 24 and, based on sensed signal(s) 24, generate control signal(s) 26. Sensed signal(s) 24 may originate from sensor(s) 22 associated with one or more engines 10. Such sensor(s) 22 may be configured to provide signals representative of one or more measured property(ies) such as, for example, temperature(s), pressure(s), force(s), relative position(s), motion(s), vibration(s) and/or others to control device(s) 20. For example, such sensor(s) 22 may be configured to provide a signal representative of a controlled pressure signal ($P_x$) and a reference pressure signal ($P_3$) to control device(s) 20.

Control device(s) 20 may comprise processor(s) 32 configured to receive sensed signal(s) 24 and use sensed signal(s) 24 as control parameter(s) to generate control signal(s) 26 useful in controlling the operation of one or more engines 10. For example, control signal(s) 26 may be used to regulate engine operation such as by controlling one or more parameter(s) such as, for example, fuel flow rate, compressor bleed position, variable inlet guide vane position, bleed valve position, and/or other parameters. Processor(s) 32 may, for example, comprise one or more digital data processor(s).

Control device(s) 20 may also comprise memory(ies) 38 and memory data devices or register(s) 40. Memory(ies) 38 may comprise any data storage devices suitable for storing data received and/or generated by processor(s) 32, preferably retrievably. For example, memory(ies) 38 may comprise one or more of any or all of erasable programmable read only memory(ies) (EPROM), flash memory(ies) or other electromagnetic media suitable for storing electronic data signals in volatile or non-volatile, non-transient form. Memory(ies) 38 may contain machine-readable instructions for execution by processor(s) 32.

FIG. 3 schematically illustrates an exemplary method 300 which may be used to detect and/or prevent surge events in compressor section 14 of engine 10. Reference will be made to the graphs of FIGS. 4a and 4b and to the elements of FIGS. 1 and 2.

In the embodiment shown, method 300 can begin at 302 where engine 10 is started. When this occurs, control device(s) 20 may begin to receive sensed signal(s) 24 from sensor(s) 22 located throughout engine 10. In the current embodiment, such sensed signal(s) 24 may include one or more controlled pressure signals ($P_x$) and one or more reference pressure signals ($P_3$). At 304, control device(s) 20 may compare the one or more controlled pressure signals with the one or more reference pressure signals. If the controlled pressure is greater than or equal to the reference pressure then a surge event may be considered to have occurred, or as about to occur, and corrective action may be taken as described below. For example, when a current value of $P_x$ is greater than a reference signal such as $P_3$, a surge event may be predicted. If the controlled pressure is less than the reference pressure then an estimated time until a subsequent surge event may be predicted.

Figure 4A:
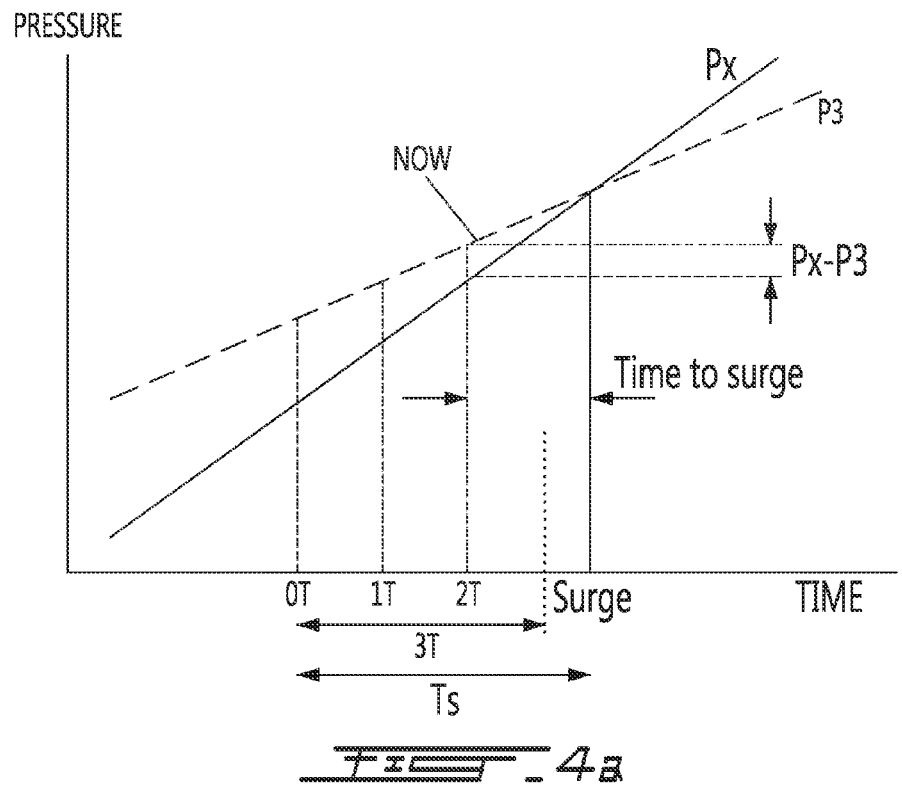
FIGS. 4a and 4b are charts illustrating examples of controlled pressure signal values and reference pressure signal values.
Figure 4B:
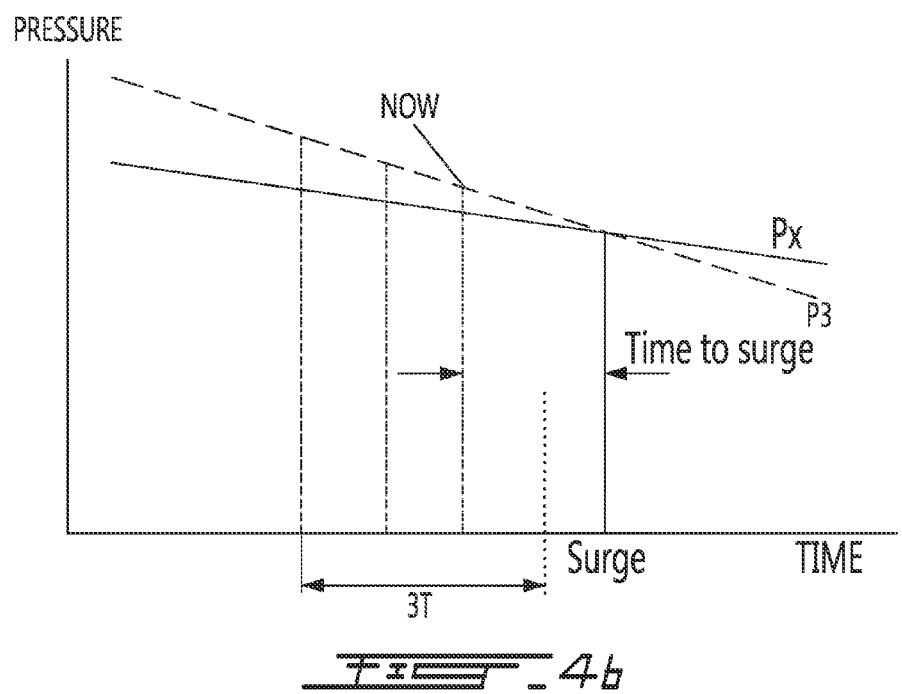

At 306, curves may be estimated for the controlled pressure and the reference pressure by fitting each respective curve through the one or more signal values. This may be performed using a suitable technique for fitting curves as is known in the art. In some embodiments, the one or more controlled pressure signal values and the one or more reference pressure signal values may be plotted on a graph such as shown in FIGS. 4a and 4b. The graph may, for example, have a pressure value axis and a time axis. As is known to those skilled in the art, fitted curves may be more accurate when more points are used (i.e. more pressure signal values are received and used to fit the curves). However, even a small number of values (for example, approximately three) may produce results which may be accurate enough to reasonably estimate the time until a compressor surge.

At 308, a time ($T_s$) until a next compressor surge may be estimated. This can be done, for example, by determining a time at which the controlled pressure curve and the reference pressure curve will intersect. If a small time step is used, the trend may be linear (for example, on the time axis of a graph of the two curves) and the time at which the intersection is expected to occur may be estimated.

At 310, the expected time to the next surge event, $T_s$, if any, estimated at 308 may be compared to a predetermined length of time T. For example, T may represent a known or predicted amount of time required or desired for processing and mechanical response to a predicted upcoming surge event. If T is not less than the expected time to the next surge event $T_s$ then method 300 may return to 304. Otherwise, if T is less than or equal to the expected time to the next surge event $T_s$, steps may be taken to control or prevent the predicted or anticipated upcoming surge event.

At 312, corrective action may be initiated to control or prevent a surge event in compressor 14 of engine 10. Control signal(s) 26 may be sent by processor(s) 32 of control device 20 in order to adjust the state (e.g., completely or partially open/closed position) of the one or more bleed valves 13 and/or to control the fuel flow from fuel injector(s) 15. In some embodiments the one or more bleed valves 13 may be set to one of a plurality of possible positions based on, for example, the current air pressure or the estimated amount of time until the expected surge event. By, for example, opening one or more bleed valves 13 to an open, or relatively more open position, pressure building at or close to the front of one or more stages of the compressor may be bled, so as to reduce such pressure and prevent stall within the compressor. In some examples, such control may also help to reduce fuel flow to a lower pressure, to help avoid a surge.

Control device(s) 20 may continue to receive sensed signal(s) 24 from engine 10 including controlled pressure signals $P_x$ and reference pressure signals P3. At 314, that is, on a continued, continual, or otherwise-repeating or -repeated basis, controlled pressure value(s) $P_x$ and reference pressure value(s) $P_3$ may again be compared to determine if the surge event has been controlled/prevented. If $P_x$ is not less than $P_3$ then method 300 returns to 312 and the corrective action continues. If $P_x$ is less than $P_3$ then it may be considered that the possible surge event has been controlled or prevented and, at 316, the corrective action taken at 312 may be discontinued. That is, control device(s) 20 may send further control signal (s) in order to cause the bleed valve(s) 13 to close and/or to discontinue fuel modulation by fuel injector(s) 15.

At 318, it is determined if the engine has been shut down. If so, method 300 ends at 320. If not, method 300 returns to 304.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A method for anticipating a compressor surge in a gas turbine engine comprising one or more bleed valves, the method comprising:
    comparing at a signal processor one or more controlled pressure signal values and one or more reference pressure signal values, each of the one or more controlled pressure signal values and the one or more reference pressure signal values having an associated time value; and
    when the one or more controlled pressure signal values are less than the one or more reference pressure signal values, at the same or another signal processor:
        fitting a controlled pressure curve through a predetermined number of points based on the one or more controlled pressure signal values and associated time values;
        fitting a reference pressure curve through a predetermined number of points based on the one or more reference pressure signal values and associated time values; and
        estimating a time to the compressor surge based on an intersection of the controlled pressure curve and the reference pressure curve;
    generating one or more control signals useful for controlling the one or more bleed valves to reduce pressure proximate to a compressor of the gas turbine; and
    controlling the one or more bleed valves based on the one or more control signals.

2. The method of claim 1, the method further comprising, when the one or more controlled pressure signal values are not less than the one or more reference pressure signal values, performing at least one of bleeding air from the gas turbine engine and modulating fuel flow to the gas turbine engine.

3. The method of claim 1, the method further comprising taking corrective action to prevent the compressor surge if the time to the compressor surge is estimated to be less than a predetermined time period.

4. The method of claim 3, wherein the corrective action comprises bleeding air from the gas turbine engine.

5. The method of claim 3, wherein the corrective action comprises modulating fuel flow to the gas turbine engine.

6. The method of claim 3, the method further comprising:
    receiving at least one updated controlled pressure signal value and at least one updated reference pressure signal value; and
    if the at least one updated controlled pressure signal value is less than the at least one updated reference pressure signal value, halting the corrective action.

7. A device useful for anticipating a compressor surge in a gas turbine engine, the device comprising:
    one or more processors configured to:
        receive one or more controlled pressure signal values and one or more reference pressure signal values, each of the one or more controlled pressure signal values and the one or more reference pressure signal values having an associated time value;
        if the one or more controlled pressure signal values are less than the one or more reference pressure signal values:
            fit a controlled pressure curve through a predetermined number of points based on the one or more controlled pressure signal values and associated time values;
            fit a reference pressure curve through a predetermined number of points based on the one or more reference pressure signal values and associated time values; and
            estimate a time to the compressor surge based on an intersection of the controlled pressure curve and the reference pressure curve;
        generate one or more control signals useful for at least one of: controlling one or more bleed valves and modulating fuel flow to the gas turbine engine; and
        cause at least one of: control of the one or more bleed valves and modulation of fuel flow to the gas turbine engine based on the one or more control signals.

8. The device of claim 7, wherein the one or more processors are further configured to cause at least one of bleeding air from the gas turbine engine and modulating fuel flow to the gas turbine engine if the one or more controlled pressure signal values are not less than the one or more reference pressure signal values.

9. The device of claim 7, wherein the one or more processors are further configured to take corrective action to prevent the compressor surge if the time to the compressor surge is estimated to be less than a predetermined time period.

10. The device of claim 9, wherein the corrective action comprises causing bleeding of air from the gas turbine engine.

11. The device of claim 9, wherein the corrective action comprises causing modulation of fuel flow to the gas turbine engine.

12. The device of claim 9, wherein the one or more processors are further configured to:
    receive at least one updated controlled pressure signal value and at least one updated reference pressure signal value; and
    if the at least one updated controlled pressure signal value is less than the at least one updated reference pressure signal value, halt the corrective action.

13. A gas turbine engine comprising the device of claim 7.

* * * * *